FIG. 1

GEORGE E. F. BREWER
GILBERT L. BURNSIDE
ALLEN H. TURNER
INVENTORS

BY John R. Faulkner
Olin B. Johnson
ATTORNEYS

FIG. 3

GEORGE E. F. BREWER
GILBERT L. BURNSIDE
ALLEN H. TURNER
INVENTORS

BY John R. Faulkner
Olin B. Johnson
ATTORNEYS

Nov. 28, 1967  G. E. F. BREWER ET AL  3,355,374
METHOD OF ELECTROCOATING WITH VARIATION OF
ELECTRICAL INDUCEMENT
Filed Dec. 30, 1963  7 Sheets-Sheet 4

FIG. 4

GEORGE E. F. BREWER
GILBERT L. BURNSIDE
ALLEN H. TURNER
INVENTORS

BY John R. Faulkner
Olin B. Johnson
ATTORNEYS

FIG. 7

United States Patent Office 3,355,374
Patented Nov. 28, 1967

3,355,374
METHOD OF ELECTROCOATING WITH VARIA-
TION OF ELECTRICAL INDUCEMENT
George E. F. Brewer, Novi, Gilbert L. Burnside, Oak Park, and Allen H. Turner, Ann Arbor, Mich., assignors to Ford Motor Company, Dearborn, Mich., a corporation of Delaware
Filed Dec. 30, 1963, Ser. No. 334,482
9 Claims. (Cl. 204—181)

ABSTRACT OF THE DISCLOSURE

A continuous method for electrically inducing deposition of an organic coating material upon electrically conductive workpieces passing through a liquid coating bath wherein the workpiece passes through a zone of predetermined electrical inducement to coating and thence into a zone of greater electrical inducement to coating. In one embodiment, a first direct current of electrical energy is provided between the workpiece and one electrode and a second direct current of electrical energy at a significantly higher potential is provided between the workpiece and another electrode.

---

This invention relates to the coating of an electrically conductive object by electrically induced deposition of an electrically charged, relatively nonconductive coating material from a liquid bath. In particular, this invention is concerned with continuous electrocoating processes wherein metallic objects are coated in an aqueous bath having an organic coating material dispersed therein. More particularly, this invention is concerned with methods and means for improving the quality of coatings formed in a continuous electrocoating operation by programming the electrical inducement to coating between the point of workpiece entry into the coating bath and the point of exit therefrom.

In continuous electrocoating operations heretofore known to the art electrically conductive workpieces are passed through the coating bath while between each such workpiece and a repelling electrode there is provided a difference of potential and a resistivity which remains essentially constant except for the increasing resistance provided by the coating forming upon the workpiece. In such operations the difference of potential provided between the opposing electrodes is maintained throughout the period of coating at a level required to effect coating at the time of coating termination.

It now has been discovered that the quality of coatings obtainable in a continuous electrocoating operation can be advantageously modified by carrying out the coating operation in an electrocoating cell that is constructed and arranged to admit of varying the current density at the workpiece with distance along the workpiece path through the coating bath independent of the variation resulting from the coating being formed.

In a first method of operation in accordance with this invention the uniformity of coating obtained in a continuous electrocoating operation is enhanced by increasing the electrical inducement to coating with distance of workpiece movement along the coating route as measured with reference to coating of stationary uncoated workpieces immersed in the coating bath along such route.

In a second method of opertaion in accordance with this invention the uniformity of coating obtained in a continuous electrocoating opertaion is enhanced by coating at a predetermined electrical inducement to coating, decreasing such electrical inducement as the workpiece moves through the coating bath and subsequently increasing the electrical inducement as measured with reference to an uncoated workpiece.

In a third method of operation in accordance with this invention coating is effected with a predetermined difference of potential between the workpiece and a repelling electrode, terminated, and subsequently reinstated at a different potential.

In a fourth method of operation in accordance with this invention the difference in potential between a hollow or compartmentalized workpiece and a secondary repelling electrode inserted therein is increased with distance of workpiece movement along the coating route while the difference of potential between the workpiece and a primary repelling electrode spaced apart therefrom is changed or held constant.

The invention will be more fully understood from the following detailed description of the methods of coating and certain apparatus by which such methods may be advantageously carried out, reference being made to the accompanying drawings wherein.

Figure 1:
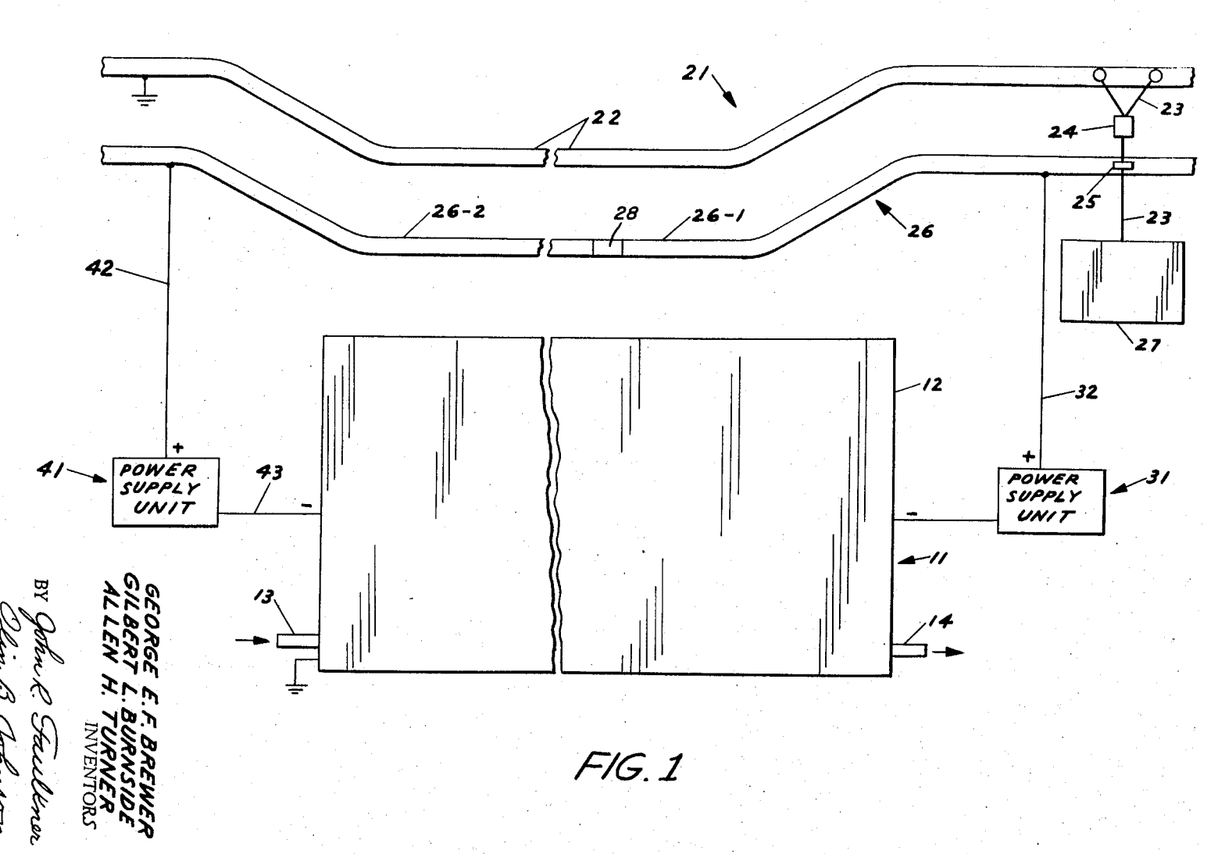
FIGURE 1 is a schematic side view of one embodiment of apparatus suitable for use in a continuous electrocoating operation wherein electrical inducement to coating is changed with the length of workpiece movement through the coating bath.

Referring now to FIGURE 1, there is shown apparatus for use in electrocoating metal objects which may utilize any of the bath retaining units shown in the FIGURES 2–6 inclusive, it being understood that in those embodiments employing tanks formed of a nonconductive material the electrical power source or sources are connected to electrodes within the tanks rather than to the tank itself as shown in FIGURE 1. The apparatus of FIGURE 1 comprises a bath retaining unit 11, a conveyor means 21, a first power supply unit 31 and a second power supply unit 41.

In this embodiment of apparatus for electrocoating, bath retaining unit 11 comprises an electrically conductive tank 12 which serves as the primary cathode of the coating cell when the coating process carried on therein is one of anodic deposition, bath agitation means, not shown, and conduits 13 and 14, for respectively introducing and withdrawing fluids from the tank.

Conveyor means 21 may be any conventional conveyor system that is suitable for use in the operations hereinafter described, e.g. an electrically powered, chain driven system adapted to continuously transport the intended workpiece through the coating bath within bath retaining unit 11. In this embodiment conveyor means 21 is represented by conveyor rail 22 and hanger 23. A workpiece 27 is shown suspended from and in electrical contact with hanger 23. Hanger 23 is adapted to be engaged by chain drive means, not shown, and thus moved along rail 22. Rail 22 is constructed and arranged in a manner such that the workpiece 27 is lowered into the coating bath as hanger 23 passes over bath retaining unit 11 and raised from the bath as it approaches the downstream side thereof. Hanger 23 is insulated from the grounded conveyor rail 22 by an insulator 24 and carries a contact plate or brush 25 by which hanger 23 and workpiece 27 are maintained in electrical connection with segmented bus bar 26.

In this embodiment the workpiece 27 serves as the anode of the electrocoating cell and is repersentative of the continuous line of workpieces passing through the coating bath.

Power supply unit 31 has one terminal in electrical connection with workpiece 27 via conductor 32, segment 26–1 of bus bar 26 and hanger 23. Power supply unit 31 has a terminal of opposite polarity in electrical connection with grounded tank 12 via conductor 33. In this embodiment tank 12 serves as the cathode of the cell.

Power supply unit 41 has one terminal in electrical connection with segment 26–2 of bus bar 26 via conductor 42 and hence is placed in electrical connection with workpiece 27 when hanger 23 is moved along rail 22 so as to bring brush 25 into contact with segment 26–2. Segments 26–1 and 26–2 are separated by an insulator 28. Power supply unit 41 has a terminal of opposite polarity in electrical connection with tank 12 via conductor 43.

Power supply units 31 and 41 are constructed and arranged to provide between the opposing electrodes and through the coating bath a direct current flow of electrical energy that is commensurate with the size of the electrocoating operation contemplated. Design of the power supply unit should take into consideration the surface area of the workpieces that will be in residence within the coating bath at any given time, the workpiece surface area entering the bath per unit time, the deposition properties of the coating formulation, the conductivity of the coating bath, the thickness of the coating to be formed, etc. Ordinarily, such current will be provided by rectification of an alternating current power source by conventional means. The power supply units preferably are adjustable to provide a difference of potential between the opposing electrodes of about 50 to 500 volts or greater.

Organic coating materials which may be employed in coating zone include, but not by way of limitation, alkyd resins, acrylate, resins, epoxy resins, phenol-formaldehyde resins, hydrocarbon resins, and other organic resins or mixtures of one or more of the foregoing resins with each other or other film-forming organic materials including binding agents and extenders conventionally employed with paints. Such materials may include or be employed with other organic monomers and/or polymers including, but not by way of limitation, hydrocarbons and oxygen substituted hydrocarbons such as ethylene glycol, propylene glycol, glycerol, monohydric alcohols, carboxylic acids, ethers, aldehydes and ketones. The film-forming material may include or be employed with pigments, metallic particles, dyes, drying oils, etc., and may be dispersed as a colloid, emulsion or emulsoid. Coating materials adapted for anodic deposition may include one or more of the aforementioned resins having free carboxyl groups or their equivalent in their polymeric structure. Dispersion of these resins in water can be effected by the addition of a suitably basic material such as ammonia, water soluble amines, mixtures of monomeric and polymeric amines, etc. Coating materials adapted for cathodic deposition may include one or more of the aforementioned resins having amine or substituted amine groups, e.g. quaternary ammonium groups, in their resin structure. Dispersion of the latter resins can be effected by the addition of suitably acidic materials such as water soluble carboxylic acids, e.g. formic acid, acetic acid, propionic acid, and suitably modified or buffered forms of certain inorganic acids, e.g. phosphoric.

In FIGURE 1 bus bar 26 is shown separated into two segments 26–1 and 26–2 by an insulator 28 which may be a conventional solid insulator material, or merely an air space between the two spaced apart segments. It is within the scope of this invention to have bus bar 26 divided into a plurality of segments each of which may be connected to a separate power source. Thus, the difference in potential between a workpiece moving through the coating bath and the repelling electrode, i.e. the tank, may be changed as the workpiece comes into electrical connection with each of the separate segments.

Figure 2:
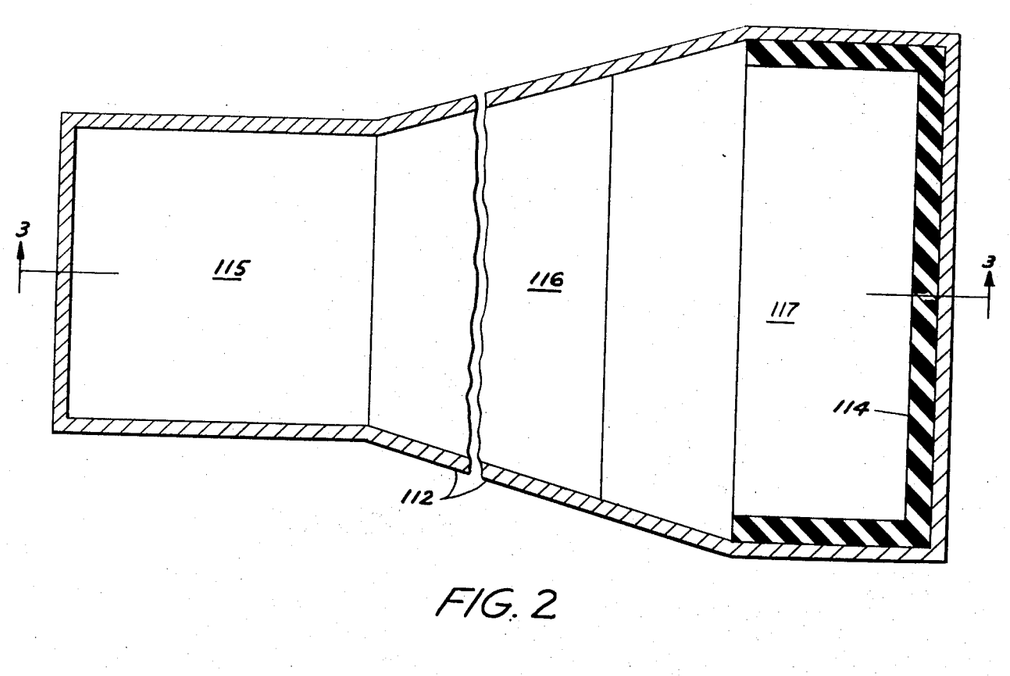
FIGURE 2 is a schematic plan view of one embodiment of the coating tank shown in FIGURE 1.
Figure 3:
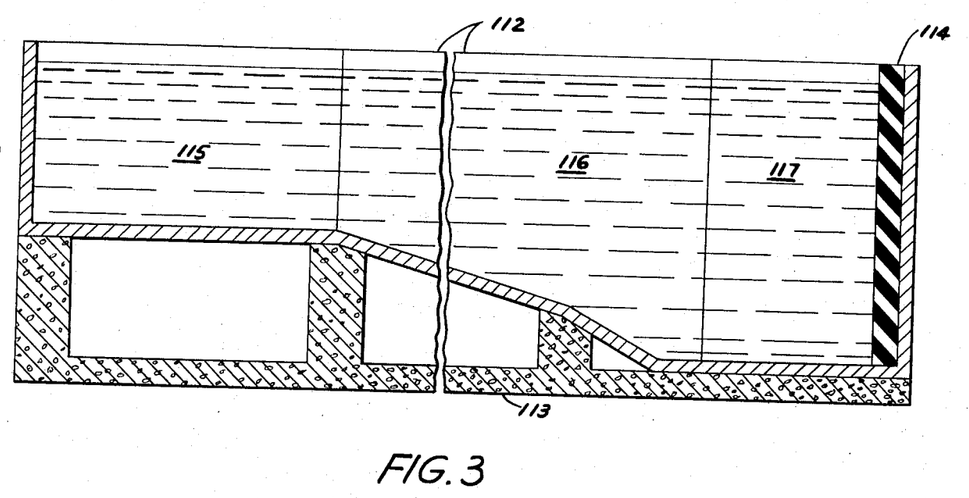
FIGURE 3 is a view taken along line 3—3 of FIGURE 2.

Referring now to FIGURES 2 and 3 there is shown an electrically conductive coating tank 112 supported by a concrete base 113 and partially lined by a nonconductive shield 114 which may be formed of a suitable plastic, glass, ceramic etc. Tank 112 increases in both depth and width from left to right as viewed in the drawings. In this embodiment a workpiece entering tank 112 for coating passes along line 3—3 and hence passes through zones 115, 116 and 117. The workpiece enters the bath, reaches a predetermined depth below the upper surface of the coating bath, and proceeds forward at such depth until it again rises to exit from the bath.

In each of these zones the distance between the workpiece and the nearest surface of the tank differs from the corresponding distance in each of the other zones. In zone 116 this distance constantly is changing within the zone. As these distances change the resistance of the bath between the tank and the coated or uncoated workpiece also changes. Hence, when operating at a constant voltage, the electrical inducement to coating, as measured upon an uncoated workpiece, increases or decreases depending upon the direction of workpiece movement through the tank.

In one preferred method of operation the workpiece enters the coating tank at the large end where the electrical inducement to coating is weakest, disregarding the resistance that will build up on the workpiece with the coating acquired in transit through the bath. The electrical inducement to coating at this end of the bath can be further reduced by masking a portion of the tank surface with a nonconductive shield, here represented by shield 114 which is not to be considered as limiting in either design or size.

Surprisingly, it has been discovered that the "throwing power" of the coating process, i.e., the ability to coat the more inaccessible surfaces of the workpiece, is enhanced by passing the workpiece through zones of increased electrical inducement to coating as opposed to maintaining the final level of such inducement throughout the process. Coatings formed in this manner have been found to tolerate more severe conditions, e.g., higher voltages, in the final stages of coating without film rupture. The increase in electrical inducement in the succeeding zones may be achieved either through an increase in the difference of potential between workpiece and repelling electrode or by a decrease in the bath resistance between the repelling electrode and the coating forming on the workpiece.

In certain electrocoating operations such as the coating of automobile bodies it has been found advantageous to insert properly insulated electrodes into internal cavities such as those afforded by the rocker panels. These electrodes may be designated secondary cathodes where the operation is one of anodic deposition. In relatively inaccessible areas such as these, it has been found desirable with certain electrocoating paints to continue the increase in electrical inducement to coating for a period which may be in excess of the time required to achieve the desired coating on the more readily accessible surfaces of the exterior. In such case the electrical inducement can be stepped up increasing the difference in potential between workpiece and secondary electrode while the workpiece as a whole moves into a larger or masked portion of the tank.

Figure 4:
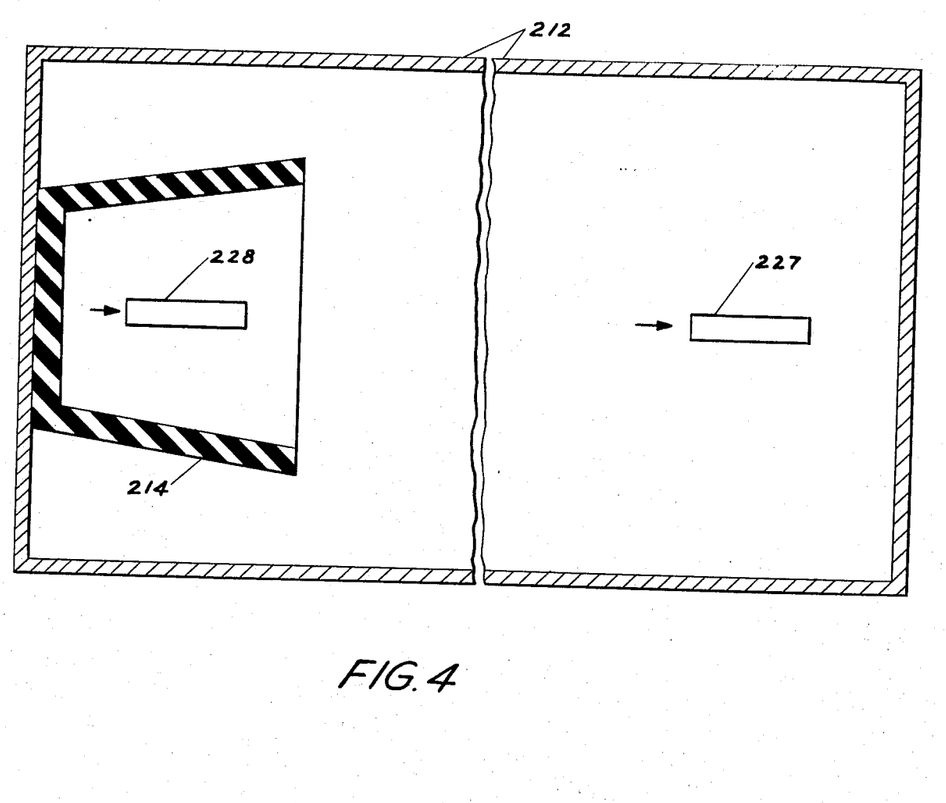
FIGURE 4 is a schematic plan view of another embodiment of the coating tank shown in FIGURE 1.

Referring now to FIGURE 4, there is shown an electrically conductive coating tank 212 that is rectangular in shape and of even depth. A difference in the electrical inducement to coating about the workpiece 227 located near one end of the tank and the corresponding inducement about the workpiece 228 is provided by an internal masking wall 214 which extends into tank 212 from one end thereof. This wall may be either solid or porous in accordance with the amount of damping effect desired. Wall 214 is formed of a suitably nonconductive material such as polyethylene, polypropylene, polystyrene, glass, ceramic, etc. When employed to partially shield the workpiece at the point of its entry into the coating bath, wall 214 lengthens the electron path between workpiece and repelling electrode, or in the case of a porous barrier increases the resistance to electron flow between the two by restricting the cross sectional area of the conductive path. In either instance the workpiece moves from an area of lesser electrical inducement to an area of greater electrical inducement as measured upon an uncoated workpiece.

Figure 5:
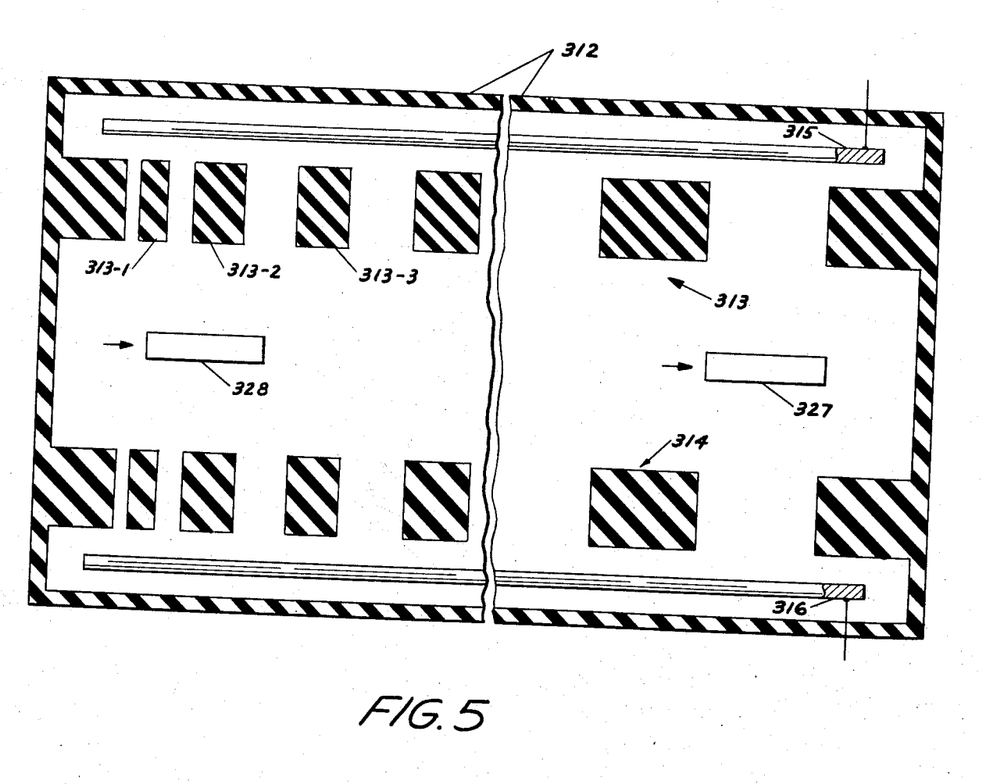
FIGURE 5 is a schematic plan view of a nonconductive tank suitable for use in carrying out certain embodiments of this invention.

Referring now to FIGURE 5, a coating tank 312 formed of a nonconductive or insulative material, e.g., polyethylene, is provided with spaced apart rows 313 and 314 of individually spaced apart, electrically nonconductive, electrode shields respectively interposed between electrodes 315 and 316 and the workpiece route indicated by workpieces 327 and 328.

In this embodiment the electrode shields are rectangular pillars that progress in width along a line parallel to the workpiece route and are spaced apart within their respective rows so as to form progressively wider channels which can be occupied by the coating bath and through which electron flow between the workpiece and the repelling electrodes can be direct. Thus, shield 313-2 is wider in the direction of workpiece movement than shield 313-1 and is separated from shield 313-1 by a lesser distance than that existing between shield 313-2 and shield 313-3 which in turn is wider than shield 313-2, etc. As the workpiece passes opposite channels between shields which progressively increase in cross sectional area and remain constant in length, the workpiece moves through zones of increasing electrical inducement to coating as measured upon an uncoated workpiece or in an aqueous bath free of coating material.

Figure 6:
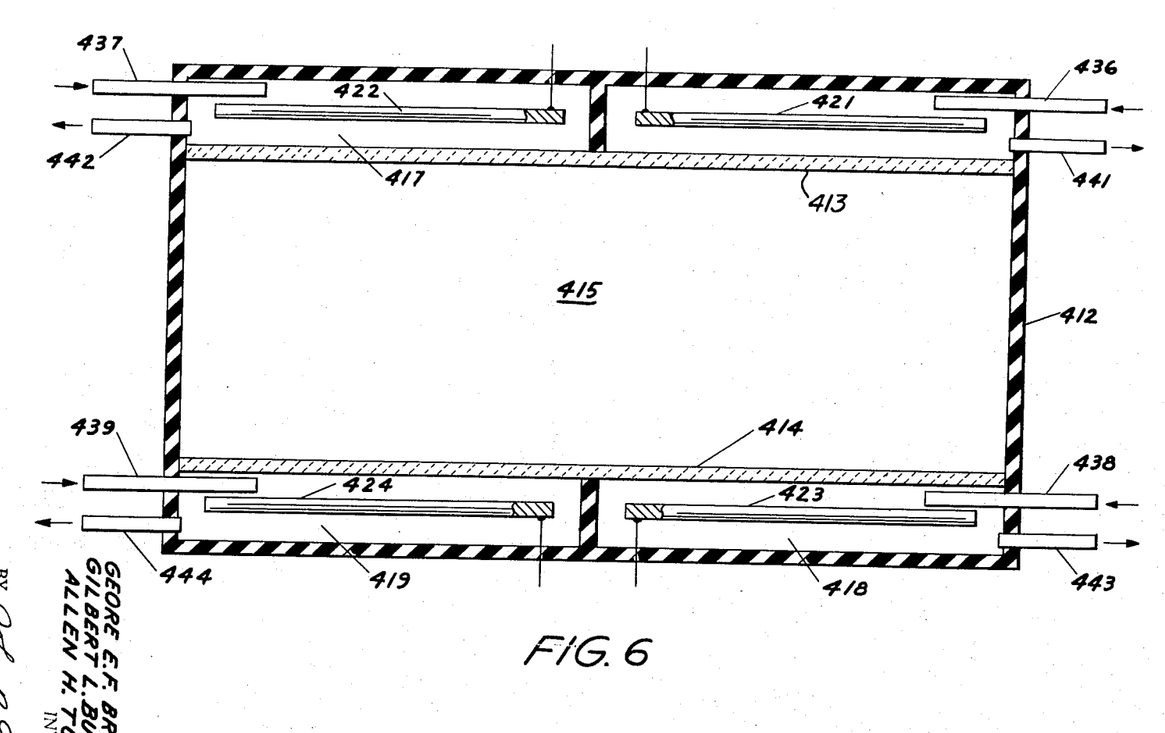
FIGURE 6 is a schematic plan view of another embodiment of a nonconductive tank suitable for use in carrying out certain other embodiments of this invention.

Referring now to FIGURE 6, a compartmentalized tank 412 formed of a suitably nonconductive material, e.g., polypropylene or chemically resistant rubber, is divided by porous internal walls 413 and 414 into a central coating zone 415 and four flushing zones 416, 417, 418 and 419. Each of the flushing zones have an electrode positioned therein. These are, respectively, electrodes 421, 422, 423 and 424. Each of the flushing zones is provided with an inlet conduit, 436, 437, 438 and 439 respectively, and an outlet conduit, 441, 442, 443 and 444 respectively. Internal walls 13 and 414 are formed of a suitably nonconductive material having pores the diameters of which are limited by a predetermined maximum. These pores should be small enough to prevent the escape of significant amounts of the organic disperse phase, e.g., the emulsion droplets, and pigment particles in those systems where the latter are designedly dispersed in the bath as a separate component as opposed to incorporation in the organic droplets. The pores should be large enough to permit the escape of water and water soluble materials from the coating zone 415 into the flushing zones and preferably are large enough to permit the escape of low molecular weight organic resin deterioration products formed in the coating operation. Preferably, the pore diameters measure in the range of about 100 A. to about 10,000 A., although the pore sizes may vary somewhat with the average size of the coating particles dispersed in the bath. Walls 413 and 414 may be formed of suitably porous natural or synthetic membranous materials which are chemically resistant to the coating bath and of sufficient structural strength to withstand the agitational and other stresses of the coating operation in which they are employed, e.g., ion permeable polystyrene, polyvinylchloride, etc. They may also be formed of a suitable ceramic material, glass, etc. The latter may be formed by grinding the solid material to particles of the desired size and then forming the porous structure by sintering or by other means known in the art Each of the flushing zones has a flushing liquid continuously introduced, circulated and removed. By employing different flushing liquids in the several flushing zones the resistance between the workpiece and the electrode pairs between which it passes can be increased or decreased. For instance, one may use distilled or filtered water in zones 416 and 418 while employing a tap water having a higher salt content in zones 417 and 419. Water soluble, ion forming materials which will not adversely affect the coating process may be added in different amounts to the separate flushing zones as desired. In the same manner opposed pairs of flushing zones may employ flushing fluids of lower conductivity than that of the coating bath, e.g. water and alcohol mixtures. The workpiece can also be passed through zones of increasing or decreasing electrical inducement to coating by control of the difference of potential between the workpiece and the matched pairs of opposing electrodes. It should be understood that although only two flushing zones are shown on either side of the bath in FIGURE 6, it is within the scope of this invention to provide more than two such zones on each side of the coating bath and to connect each pair with a different power source.

A series of tests were conducted which illustrate some of the advantages obtainable by carrying out an electrocoating operation in accordance with the various embodiments of this invention.

First, in an anodic deposition process two anodes were placed in a plastic tank containing a single cathode at ground potential and an aqueous dispersion of an automobile primer paint as the coating bath. The difference of potential between the cathode and the positively charged workpieces, the anodes, was maintained 50 volts for 10 seconds. The first pair of anodes were removed and a second pair of anodes were coated in the same manner at 100 volts. The second pair of anodes were removed and a third pair of anodes were inserted into the same bath but this time one was maintained at a potential of 50 volts with reference to the cathode while the other was connected to a different power source and maintained at a potential of 100 volts. Simultaneous deposition on the two workpieces at different voltages produced on the more positive anode a thicker film than was obtained when both workpieces were maintained at the higher voltage. The less positive workpiece in the simultaneous deposition at different voltages received a thinner coating than that obtained when both workpieces were maintained at the lower voltage.

Second, a workpiece that had been coated at a potential of 50 volts was suspended between a workpiece in electrical connection with a conductor maintained at potential of 100 volts with reference to the cathode of the cell and another workpiece in electrical connection with a conductor maintained at a potential of 50 volts with reference to the same cathode. The distance between workpieces was 4 inches. No significant difference in thickness of coating could be detected between the two faces of the intermediate electrode after 30 seconds of coating the charged workpieces on either side. This and similar tests at greater spacing intervals for workpieces demonstrated the feasibility of employing a segmented bus bar with succeeding segments having higher potentials.

Third, tests were carried out employing a plastic tank having electrode shields similar to that illustrated in FIGURE 5. The paint employed was an aqueous dispersion of an automobile primer containing 5% solids. The electrodes were of mild steel and measured 1½″ x 4½″ with 1″ immersion. The deposition time was 1 minute. The channels between electrode shields measured 1″ and ¼″ in width and were of the same length. The length of each channel was about 4.5″ with the cathode and anodes spaced about 0.5″ from the mouth of the channel. The workpieces positioned opposite the two channels were coated first at 300 volt potential difference between workpiece and cathode and then at a 400 volt difference of potential. At 300 volts the coating formed opposite the 1″ channel measured 1.0 to 1.2 mills and was rough while the coating formed opposite the ¼″ channel measured 0.6 to 0.7 mil and was smooth. At 400 volts the coating opposite the 1″ channel was very heavy and blistered while the coating opposite the ¼″ channel measured 0.5 to 0.8 mil and was smooth. Voltage measurements made over the lengths of the two channels indicated that the two voltage drops were essentially equal.

Figure 7:
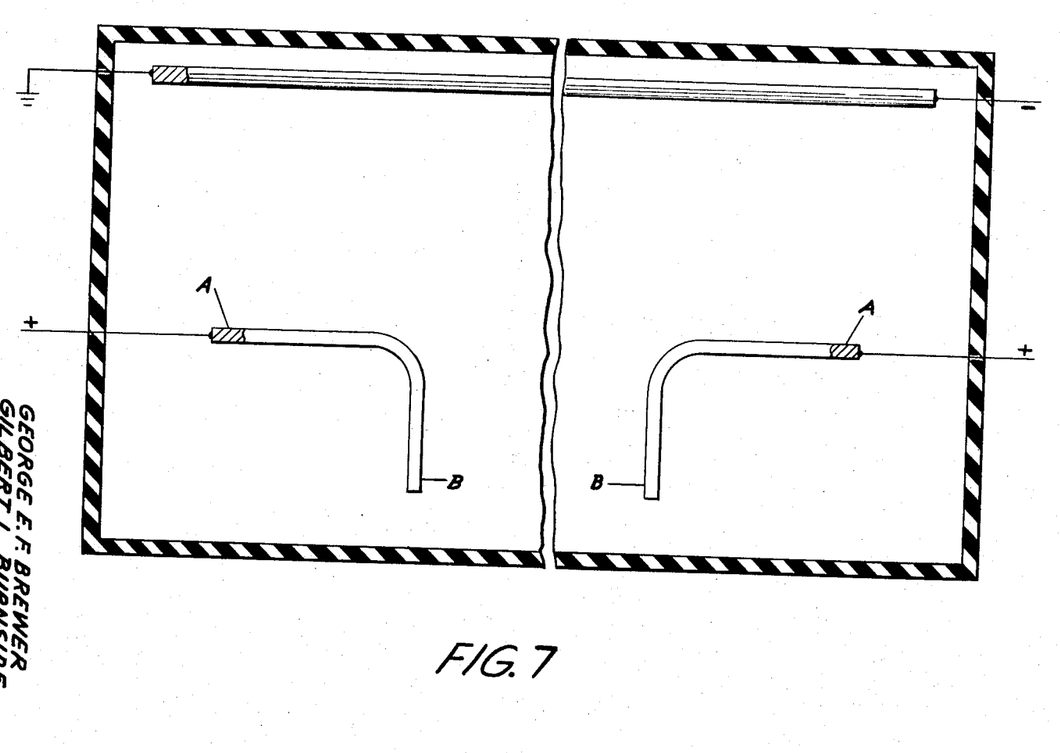
FIGURE 7 is a schematic plan view of coating apparatus which may be used to illustrate certain embodiments of the invention.

Fourth, to check the effect of multiple voltage operation on film uniformity a cell was arranged as illustrated in FIGURE 7. The coating material was an automobile primer paint comprising an organic resin having free carboxylic acid groups in its polymeric structure dispersed in water with a water soluble amine. Coating was continued for 30 seconds in each test. A pair of anodes were coated at 50 volts, another pair at 100 volts, and another pair were coated with one electrode maintained at a 50 volt potential with reference to the cathode while the other was maintained at a 100 volt difference of potential. With both coated at 50 volts the coating in the area indicated as zone A was 0.26 mil while that in zone B was 0.22 mil. With both coated at 100 volts the coating depth in zone A was 0.41 mil and that in zone B was 0.40 mil. When different voltages were used as above described the coating on the low voltage test panel measured 0.21 mil at zone A and 0.17 mil at zone B while the coating obtained on the high voltage test panel measured 0.47 mil at zone A and 0.40 mil at zone B.

Further tests were carried out with a variety of coating formulations to ascertain the voltage at which film rupture occured. Certain of these formulations were then applied to metal objects as hereinbefore described, i.e. the coating was applied by passing the workpiece through successive zones of increased electrical inducement to coating. With both gradual or stepwise increase in voltage it was demonstrated that higher voltages could be employed before reaching a voltage at which film rupture occurred, hence providing a process capable of coating more recessed area to an acceptable depth. The same effect was achieved by terminating the coating and reinitiating the coating at a higher voltage.

The aforedescribed embodiments of this invention should be considered in all respects as illustrative and not restrictive, the scope of the invention being indicated by the appended claims.

We claim:

1. In a continuous method of coating which comprises passing electrically conductive objects through a liquid coating bath having an organic coating material dispersed therein and a first electrode in electrical communication therewith, each of said objects while passing through said bath serving as a second electrode, and providing a direct current flow of electrical energy through said bath and between said first electrode and said second electrode thereby electrically inducing deposition of said coating material upon said second electrode, the improvement which comprises passing said second electrode through a zone of predetermined electrical inducement to coating as measured by the current density upon an uncoated electrode and thence into a zone of greater electrical inducement to coating as measured by the current density upon an uncoated electrode before removing said second electrode from said bath.

2. In a continuous method of coating which comprises passing electrically conductive objects through a liquid coating bath having an organic coating material dispersed therein and a first electrode in electrical communication therewith, each of said objects while passing through said bath serving as a second electrode, and providing a direct current flow of electrical energy through said bath and between said first electrode and said second electrode thereby electrically inducing deposition of said coating material upon said second electrode, the improvement which comprises passing said second electrode through a first zone of said bath wherein the liquid coating bath provides a predetermined level of electrical resistance between said first electrode and said second electrode and subsequently moving said second electrode into a second zone within said bath wherein said resistance is decreased.

3. In a continuous method of coating which comprises passing electrically conductive objects through a liquid coating bath having an organic coating material dispersed therein and a first electrode in electrical communication therewith, each of said objects while passing through said bath serving as a second electrode, and providing a direct current flow of electrical energy through said bath and between said first electrode and said second electrode thereby electrically inducing deposition of said coating material upon said second electrode, the improvement which comprises decreasing the electrical resistance of the liquid coating bath between said first electrode and said second electrode as said second electrode moves through said bath.

4. In a continuous method of coating which comprises passing electrically conductive objects through a liquid coating bath having an organic coating material dispersed therein and a first electrode in electrical communication therewith, each of said objects while passing through said bath serving as a second electrode, and providing a difference of electrical potential between said first electrode and said second electrode thereby providing a direct current flow of electrical energy through said bath between said first electrode and said second electrode which electrically induces deposition of said coating material upon said second electrode, the improvement which comprises having a third electrode in electrical communication with said bath and providing a second direct current flow of electrical energy through said bath between said second electrode and said third electrode which induces deposition of coating material upon said second electrode, said second flow of electrical energy being at a significantly higher potential than the flow between said first electrode and said second electrode.

5. In a continuous method of electrocoating which comprises passing electrically conductive objects through and aqueous coating bath having an organic coating material dispersed therein, placing a first electrode and a second electrode in electrical communication with said bath, each of said objects while passing through said bath serving as a third electrode, and providing a difference of electrical potential between said third electrode and said first and second electrodes thereby providing a direct current flow of electrical energy through said a bath between said third electrode and said first and second electrodes which electrically induces deposition of said coating material upon said third electrode, the improvement which comprises increasing the difference of electrical potential between said third electrode and said first electrode as said third electrode moves through said bath while maintaining the difference of potential between said third electrode and said second electrode constant.

6. In a continuous method of electrocoating which comprises passing electrically conductive objects through an aqueous coating bath having an organic coating material dispersed therein, placing a first electrode and a second electrode in electrical communication with said bath, each of said objects while passing through said bath serving as a third electrode, and providing a difference of electrical potential between said third electrode and said first and second electrodes thereby providing a direct current flow of electrical energy through said bath between said third electrode and said first and second electrodes which electrically induces deposition of said coating material upon said third electrode, the improvement which comprises increasing the difference of electrical potential between said third electrode and said first electrode as said third electrode moves through said bath while decreasing the difference of potential between said third electrode and said second electrode.

7. In a continuous method of coating which comprises passing electrically conductive objects through a liquid coating bath having an organic coating material dispersed therein and a first electrode in electrical communication therewith, each of said objects while passing through said bath serving as a second electrode, and providing a difference of electrical potential between said first electrode and said second electrode thereby providing a direct current flow of electrical energy through said bath between said first electrode and said second electrode which electrically induces deposition of said coating material upon said second electrode, the improvement which comprises having a third electrode in electrical communication with said bath, interrupting said flow of electrical energy between said first electrode and said second electrode, and providing a second direct current flow of electrical energy through said bath between said second electrode and said third electrode which induces deposition of coating material upon said second electrode, said second flow of electrical energy being at a significantly higher potential than the flow between said first electrode and said second electrode.

8. In a continuous method of coating which comprises passing electrically conductive objects through a liquid coating bath having an organic coating material dispersed therein and a first electrode in electrical communication therewith, each of said objects while passing through said bath serving as a second electrode, and providing a difference of electrical potential between said first electrode and said second electrode thereby providing a direct current flow of electrical energy through said bath between said first electrode and said second electrode which electrically induces deposition of said coating material upon said second electrode, the improvement which comprises having a third electrode in electrical communication with said bath, maintaining a difference of electrical potential between said second electrode and said third electrode, and providing a second direct current flow of electrical energy through said ba between said second electrode and said third electro which induces deposition of coating material upon sa second electrode, the difference in electrical potential b tween said second electrode and said third electrode b ing significantly greater than the difference of electric potential between said first electrode and said secon electrode.

9. In a continuous method of coating which compris passing electrically conductive objects through a liqui coating bath having an organic coating material disperse therein and a first electrode in electrical communicatio therewith, each of said objects while passing throug said bath serving as a second electrode, and providin a difference of electrical potential between said first elec trode and said second electrode thereby providing a di rect current flow of electrical energy through said bat between said first electrode and said second electrod which electrically induces deposition of said coating ma terial upon said second electrode, the improvement whicl comprises having a third electrode in electrical communi cation with said bath, interrupting said flow of electrica energy between said first electrode and said second elec trode, providing a difference of electrical potential be tween said second electrode and said third electrode, anc providing a second direct current flow of electrical energy through said bath between said second electrode and saic third electrode which induces deposition of coating material upon said second electrode, the difference in electrical potential between said second electrode and said third electrode being significantly greater than the difference of electrical potential between said first electrode and said second electrode.

References Cited

UNITED STATES PATENTS

| | | | |
|---|---|---|---|
| 3,200,057 | 8/1965 | Burnside et al. | 204—181 |
| 3,230,162 | 1/1966 | Gilchrist | 204—181 |

ROBERT K. MIHALEK, *Primary Examiner.*

JOHN H. MACK, *Examiner.*

E. ZAGARELLA, *Assistant Examiner.*